Sept. 1, 1953 E. W. THRAILKILL 2,650,674
DUST COLLECTOR
Filed Nov. 10, 1950 6 Sheets-Sheet 1

INVENTOR,
Elmer W. Thrailkill.
BY
Hamilton & Hamilton,
Attorneys.

Sept. 1, 1953  E. W. THRAILKILL  2,650,674
DUST COLLECTOR
Filed Nov. 10, 1950  6 Sheets-Sheet 2

INVENTOR,
Elmer W. Thrailkill
BY
Hamilton & Hamilton
Attorneys.

Sept. 1, 1953 E. W. THRAILKILL 2,650,674
DUST COLLECTOR
Filed Nov. 10, 1950 6 Sheets-Sheet 4

INVENTOR,
Elmer W. Thrailkill.
BY
Hamilton & Hamilton,
Attorneys.

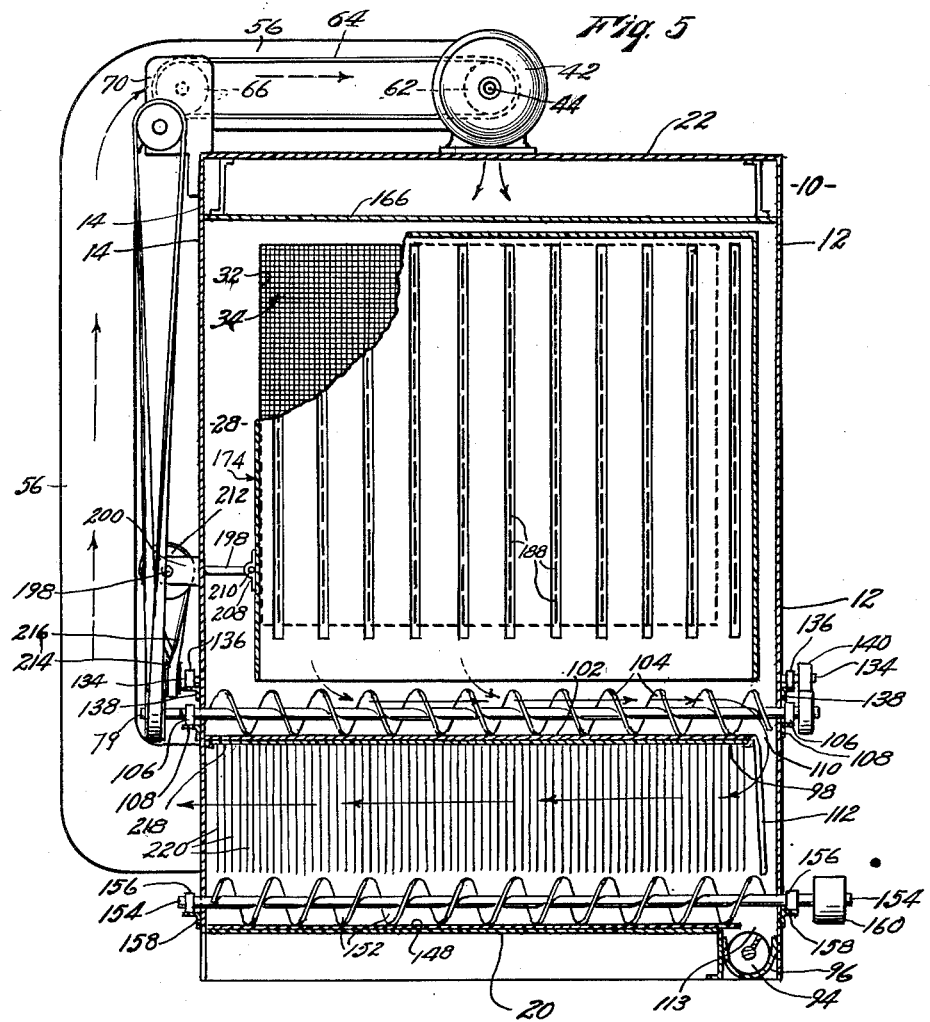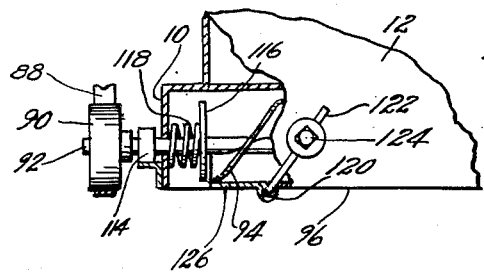

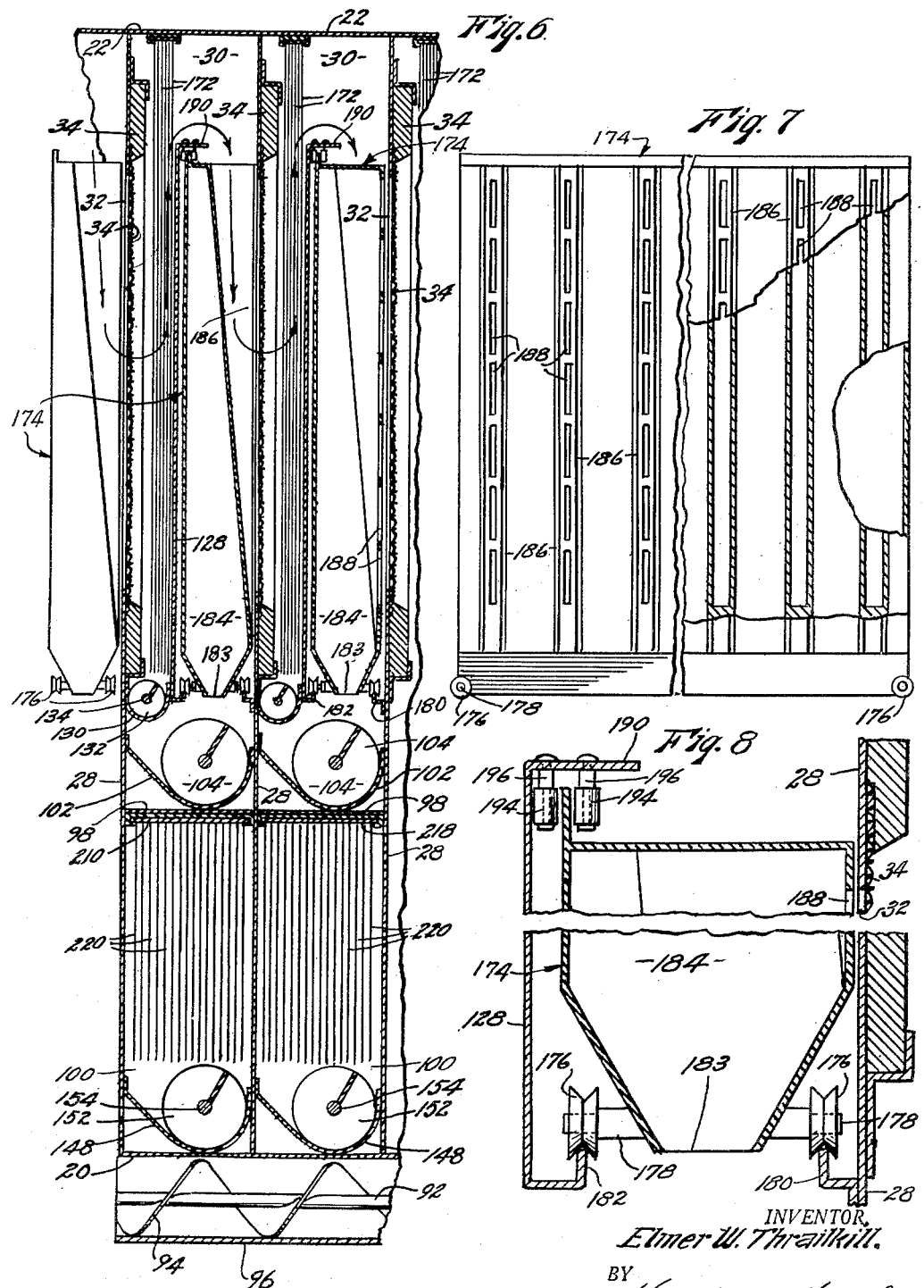

Patented Sept. 1, 1953

2,650,674

UNITED STATES PATENT OFFICE 2,650,674

DUST COLLECTOR

Elmer W. Thrailkill, North Kansas City, Mo.

Application November 10, 1950, Serial No. 195,015

6 Claims. (Cl. 183—61)

This invention relates to improvements in dust collectors and has particular reference to a dust collector having a series of screens through which air to be cleaned is successively passed.

The principal object of the present invention is the provision of a reciprocating suction member mounted adjacent the inside of each of said screens whereby dust collected on said screens may be removed from the screens and delivered out of the line of travel of said air.

Another object of this invention is the provision of series of spaced apart depending strands through which the air to be cleaned must pass as it moves to and from said screens whereby dirt is collected on said strands and by-passed to a dust bin.

Another object of this invention is the provision of dust collector having a series of dust collecting units disposed in the path of travel of the air being cleaned, and blower means and suction means operable to facilitate the travel of air through this collector.

A further object of the invention is the provision of a dust collector having a series of spaced apart screens through which air to be cleaned is successively passed, and suction means to remove collected dust from the front sides of said screens and deliver it to a dust bin, and blower means operable whereby air from said suction means is recirculated through said screens.

Other objects are simplicity and economy of construction, ease and efficiency of operation, and adaptability for handling dust laden airs of varying densities.

With these objects in view as well as other objects which will appear during the course of the specification reference will be had to the drawings wherein:

Fig. 5 is an end elevation of the dust collector with the body portion thereof irregularly sectioned to show the relation of some of the parts.

Fig. 6 is an enlarged sectional view of certain units of the collector with the dust collector members shown in various views.

Fig. 7 is a foreshortened face view of one of dust collector members shown partially in section.

Fig. 8 is a fragmentary sectional view showing the mounting of the dust collector member in the chamber.

Fig. 9 is an enlarged sectional view of the delivery end of the lower dust conveyor.

Figure 1:
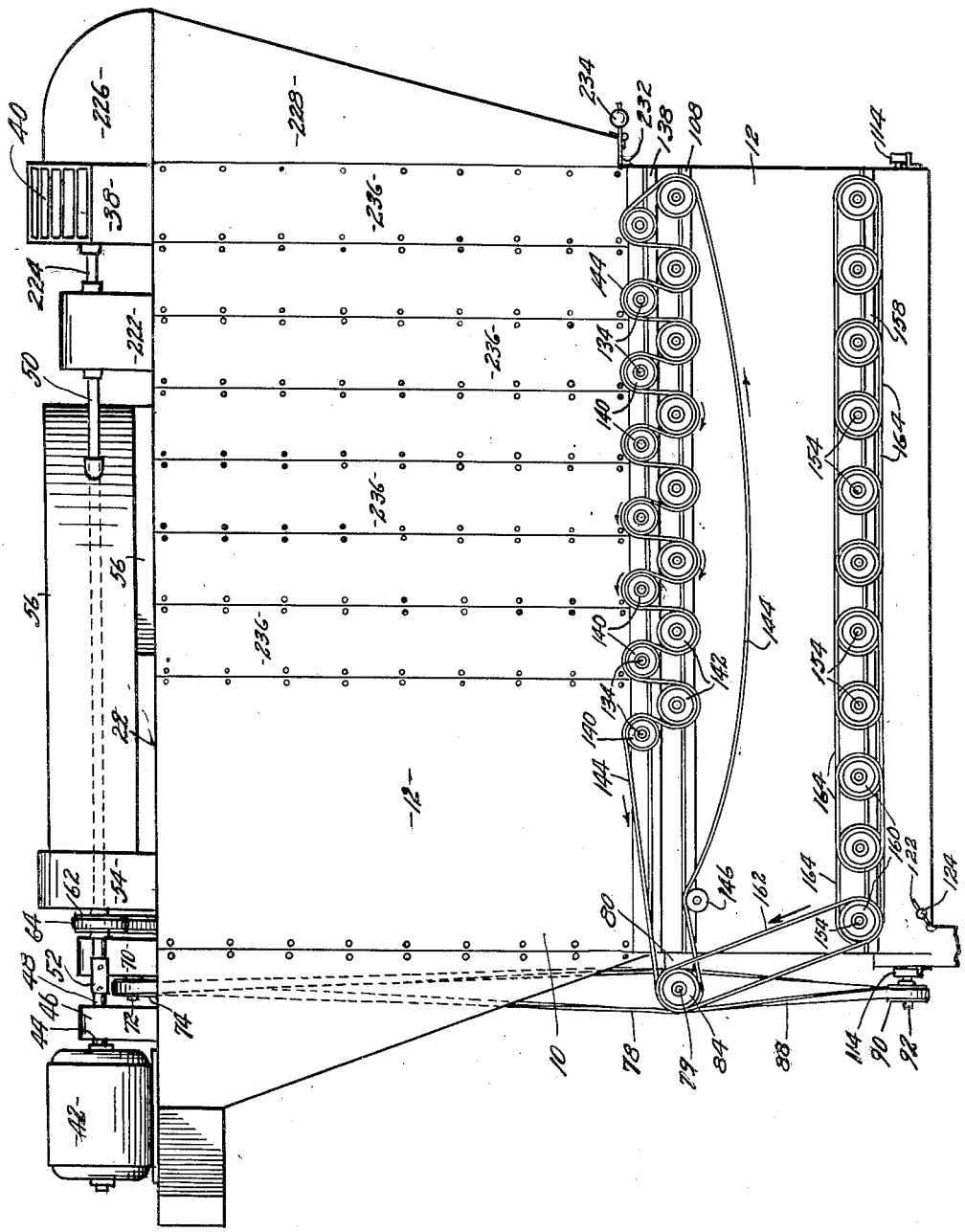
Fig. 1 is a front elevation of the dust collector embodying this invention.

Throughout the several views like reference characters refer to similar parts and the numeral 10 designates a housing of substantially rectangular from having a front wall 12, a rear wall 14, end walls 16 and 18, a bottom 20, and top 22. The upper end portion 24 of end member 18 extends outwardly and upwardly, then outwardly in parallel, spaced apart relation with top 22 to present inlet port 26, through which dust laden air is delivered to the dust collector. The right portion of the housing is provided with a series of vertically disposed, spaced apart partitions 28, which extend from the bottom 20 to the top 22 of the container to form a series of substantially like compartments 30. Each partition 28 is provided with large opening 32 which is completely covered with a framed screen 34. These screens may vary in mesh to facilitate proper screening of the air. It has been found best to provide coarser screens for receiving the incoming air at the left and to gradually decrease the mesh as the air proceeds to the right, thus insuring a fine screening of the air as it leaves the dust collector through conduit 228 which leads to the suction pump 38 which discharges through outlet 40 to the desired place of discharge.

The power unit shown for this collector is an electric motor 42 shown mounted on top of the housing 10 adjacent its left end, and having a driven shaft 44 which connects with speed reducer 46. Shaft 48 of speed reducer 46 is driven at the desired reduced speed and is joined to a shaft 50 by means of a suitable coupling 52. Shaft 50 drives suction fan 54 which draws air through conduit 56 which connects with the lower back side of the housing 10. This shaft 50 is mounted in a bearing 58 carried by conduit 56 and operatively connects with a speed reducer 222 which has a driven shaft 224 which drives suction pump or fan 38 which exhausts through outlet 40.

A belt wheel 62 rigidly mounted on shaft 50 is operatively interconnected by belt 64 with belt wheel 66 which drives shaft 68 of the speed reducer 70. The slow speed output shaft 72 of this speed reducer 70 is provided with a belt wheel 74, which is operatively connected with belt wheel 76 by means of twisted belt 78. This belt wheel 76 is rigidly attached to a horizontally disposed drive shaft 79 which is rotatably mounted in bearings 80 carried by end wall 18.

The forward end of shaft 79 extends beyond front wall 12 and is provided with two belt pulleys 82 and 84 that serve to drive certain auger type conveyors hereinafter described. Another belt pulley 86 mounted on shaft 79 between bearings 80 is interconnected by a twisted belt 88 with a pulley 90 mounted on shaft 92 of the screen conveyor 94 positioned in trough 96 rigidly secured to housing 10 at its lower extremity.

Referring now to Fig. 6 which shows the screening units in enlarged form, it will be noted that a horizontally disposed partition 98 extends between adjacent partitions 28 in spaced relation above bottom 20 of the container to form a lower compartment 100 between adjacent vertical partitions. Just above partition 98 is a conveyor trough 102, which operatively received a screw conveyor 104 which is mounted at its opposite shaft ends for rotation in bearings 106 which are mounted on angle iron brackets 108 mounted respectively on front wall 12 and rear wall 14. Screw conveyor 104 is right hand and is rotated to deliver dust materials to the front end of the collector where it will be delivered through opening 110 formed through partition 98 where it will be guided by ducts 112, through opening 113 to bottom 20 to transversely disposed conveyor 94. This conveyor is of the screw type and is positioned at the bottom side of the collector to serve as the final conductor for the dust removed from the air. The screw conveyor 94 is rotatably mounted at its opposite ends in suitable bearings 114 which are carried by housing 10.

The left end of screw conveyor 94, see Fig. 9, is the delivery end which is provided with gate 116 which is normally held in the closed position by means of a helical spring 118 positioned between the gate 116 and the housing 10. The lower portion of trough 96 is severed to present a trap door 126 adjacent the gate 116 and is freed to pin 120 which is pivoted in sockets formed in the adjacent portion of the trough. The outer extremity of pin 120 is bent to form a crank arm 122 on which is adjustably mounted a counter balance 124, which normally serves to hold the trap door 126 in the closed position. When sufficient dirt is deposited on the trap door 126 by the action of screw conveyor 94 the door will open sufficiently to tilt to permit the dirt to fall from the conveyor. Should this trap door for any reason become inoperative and the dirt is forced against gate 116 the spring 118 will be compressed and the dirt will be forced from the conveyor. Gate 116 and trap door 126 are normally held in closed position to prevent the escape of too much air from the system.

Referring to Fig. 6 it will be noted that a vertical partition 128 spaced between adjacent partitions 28 is parallel with said partitions 28 and is spaced apart from top 22 and horizontal partition 98. The lower end of partition 128 is joined to the adjacent partition 28 by means of a trough 130 which is positioned above conveyor 104. Mounted in trough 130 is a screw conveyor 132, the shaft 134 of which extends outward through front wall 12 and back wall 14 and are mounted in bearings 136 which are mounted on angle iron brackets 138 carried by housing 10. The front end of each of the shafts 134 is provided with a belt pulley 140 which is in planar relation with a series of pulleys 142 mounted on the forwardly extended ends of shafts of screw conveyor 104.

Referring to Fig. 1 it will be noted that these two series of belts are driven by an endless belt 144 which is driven by drive pulley 82 fixed on drive shaft 79. This belt 144 zigzags about said offset series of pulley whereby the two series of conveyors are driven in opposite directions. Since both series of conveyors need to deliver the collected dust toward the front of the machine the conveyor 104 is a right hand screw and the conveyor 132 is a left hand. To properly position belt 144 on pulley 82 an idle pulley 146 carried by front wall 12 is positioned adjacent pulley 80 to support the sag of the lower leg of belt 144.

Figure 2:
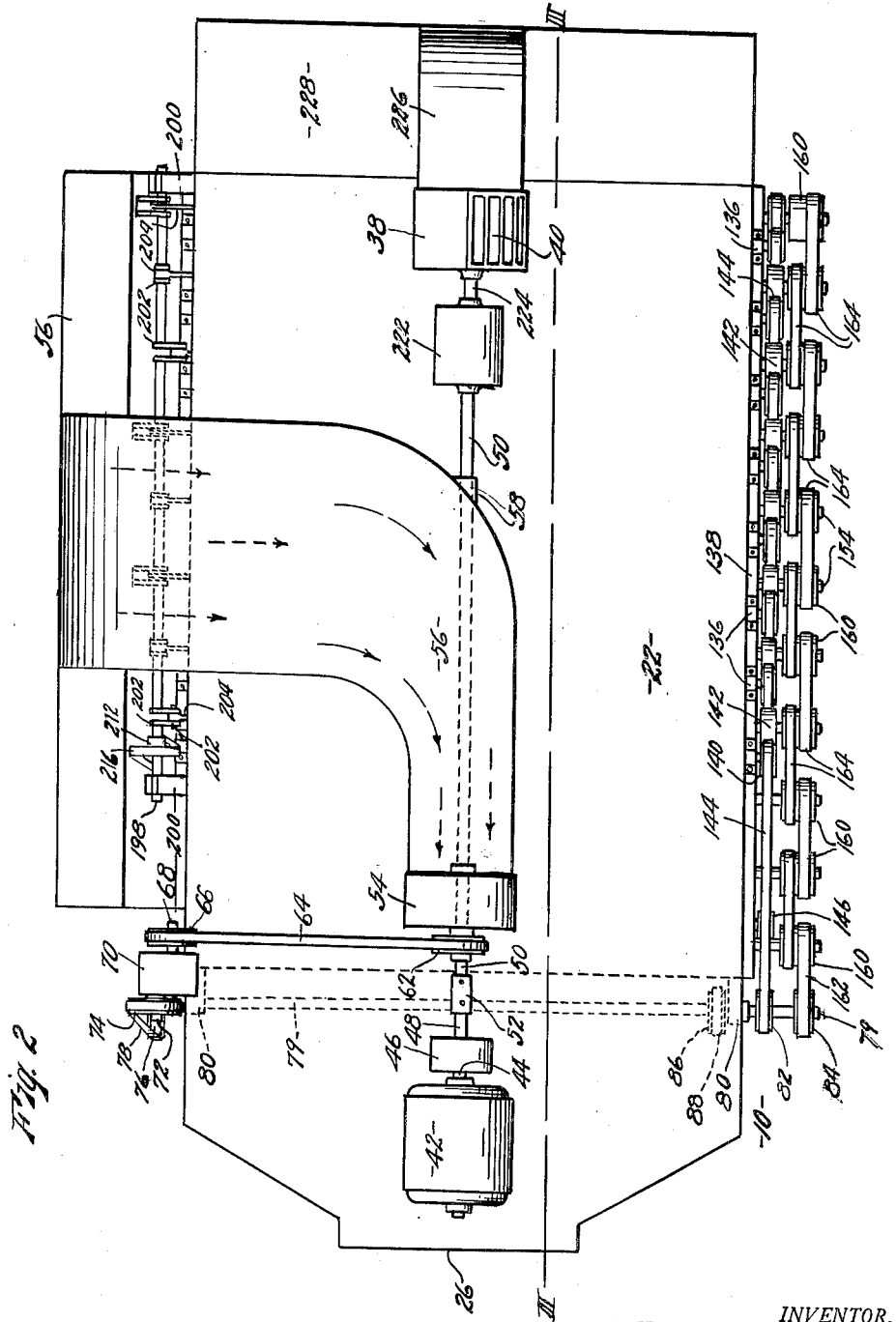
Fig. 2 is a plan elevation of the dust collector shown in Fig. 1.
Figure 3:
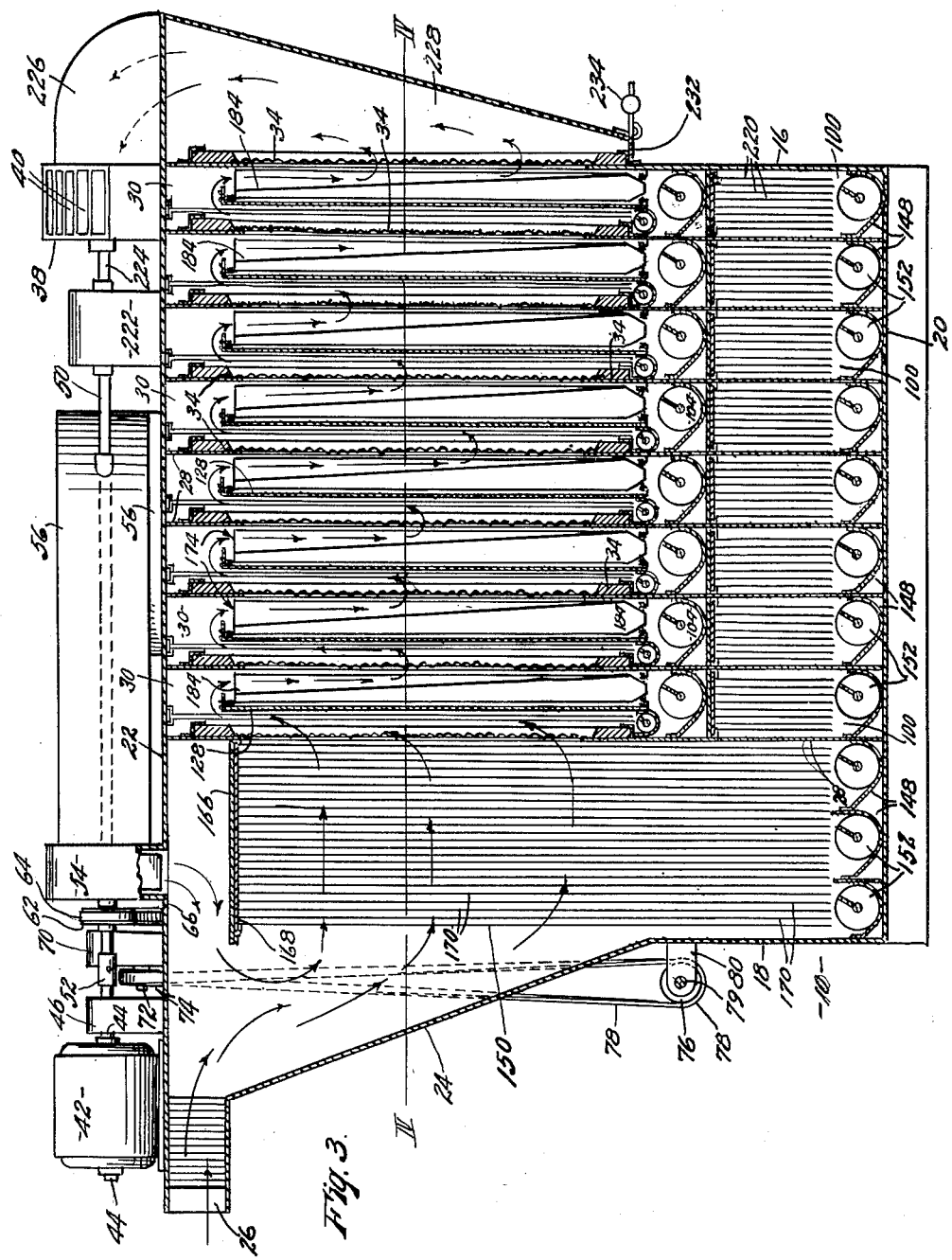
Fig. 3 is a vertical sectional view taken on line III—III of Fig. 2.

Referring to Fig. 3 it will be noted that series of troughs 148 positioned respectively in compartments 100 and in the enlarged compartment 150 therebeyond. Each trough is provided with a screw conveyor 152 which has a central shaft 154 that extends through both the front and rear walls of the housing to be mounted in bearings 156 carried by brackets 158 carried respectively by the front and rear walls. At the front of the machine each of the shafts 154 is provided with a relatively broad, fixed belt wheel 160. These belt wheels are all driven in the same direction to deliver collected dust to the front of the machine. The belt wheel 160 adjacent drive shaft 79 is driven by belt 162 which connects drive pulley 84 therewith. Short drive belts 164 alternately interconnect adjacent broad belt wheels 160. Referring to Fig. 2 it will be noted that the belts 164 are alternately positioned at opposite sides of belt wheels 160 thus presenting a constant drive of all the shafts 154 in the same direction of rotation. The end compartment 150 is provided with a horizontal partition 166 extending outwardly from partition 28 and is disposed in spaced relation below top 22. The under side of partition 166 is provided with a holder 168 which carries a plurality of spaced apart dust collecting strands 170 through which the incoming air from port 26 and the recirculated air from blower 54 must pass to reach the compartments 30. These strands hang by gravity to a level just above conveyors 152, so that dust collecting on the strands will as it gains size and weight, be directed along the strands and delivered to conveyors 152 then to the conveyor 94 at the front of the machine. Strands 170 may be of fabric, metal or any other suitable material which may or may not be treated to cause a better adhesion of the dust particles thereto. Due to the fact that the incoming air first contacts these strands it is apparent that much dust will be collected in this zone of the collector.

The flow of air through the collector is indicated by arrows in Figs. 3 and 5. It will be noted that the general air flow is caused by a suction and not by a compressing of the air, thus preventing to a large degree the possibility of leakage of air and dust from the collector. The main suction air pump 38 is of greater capacity than the suction fan 54 that draws air from compartments 100 for recirculation through the screens.

Each compartment 30 is provided with a plurality of spaced apart depending dust collecting strands 172 which are positioned between screen 34 and partition 128, to extend down to a level just above screw conveyor 132, so that dust collected thereon will be deposited in trough 130 and deliveries to the front side of the collector and then deposited downwardly to conveyor 94 and to the dust collecting bin. Dust has a tendency to collect on the front side of screens 34.

and clog them. To overcome this difficulty and to remove most of this accumulated dust the following suction mechanism which includes an especially constructed dust chamber 174 which is provided adjacent its lower extremity with grooved wheels 176 mounted on axles 178 carried by the chamber 174. These wheels operatively engage tracks 180 and 182 which are respectively carried by partitions 28 and 128, to permit a longitudinal reciprocation of the dust chamber by means hereinafter described. The chamber 174 comprises a box like compartment 184 open along its bottom side at 183 and provided with a series of hollow ribs 186 which are of inverted wedge shape with their forward faces disposed adjacent screen 34 and in a plane parallel therewith. Each rib 186 is provided with a series of narrow spaced apart openings 188 which extend substantially the full vertical dimension of the screws so that as the dust chamber is moved through a distance equal to the distance between the equally spaced hollow ribs the entire surface of the screw will be traversed by said slots to suck accumulated dust therefrom. Due to the reciprocation of the dust chamber the suction slots will pass successively in opposite directions across the screen thus producing a better cleaning action. The upper portion of dust chamber 174 is spaced below top plate 22 and below horizontal flange 190 of partition 128. The rear side of dust chamber 174 is provided with an upwardly extending flange 192 which is positioned between sets of rollers 194 mounted for rotation on standards 196 securely attached to flange 190. This guiding flange together with grooved wheels serve to maintain the suction slots 188 in substantially uniform spaced relation to the screen 34. The dust drawn in through slots 188 moves by gravity through the outlet opening 183 and into trough 102 where it is drawn by screw conveyor 104 to the front of the machine.

Figure 4:
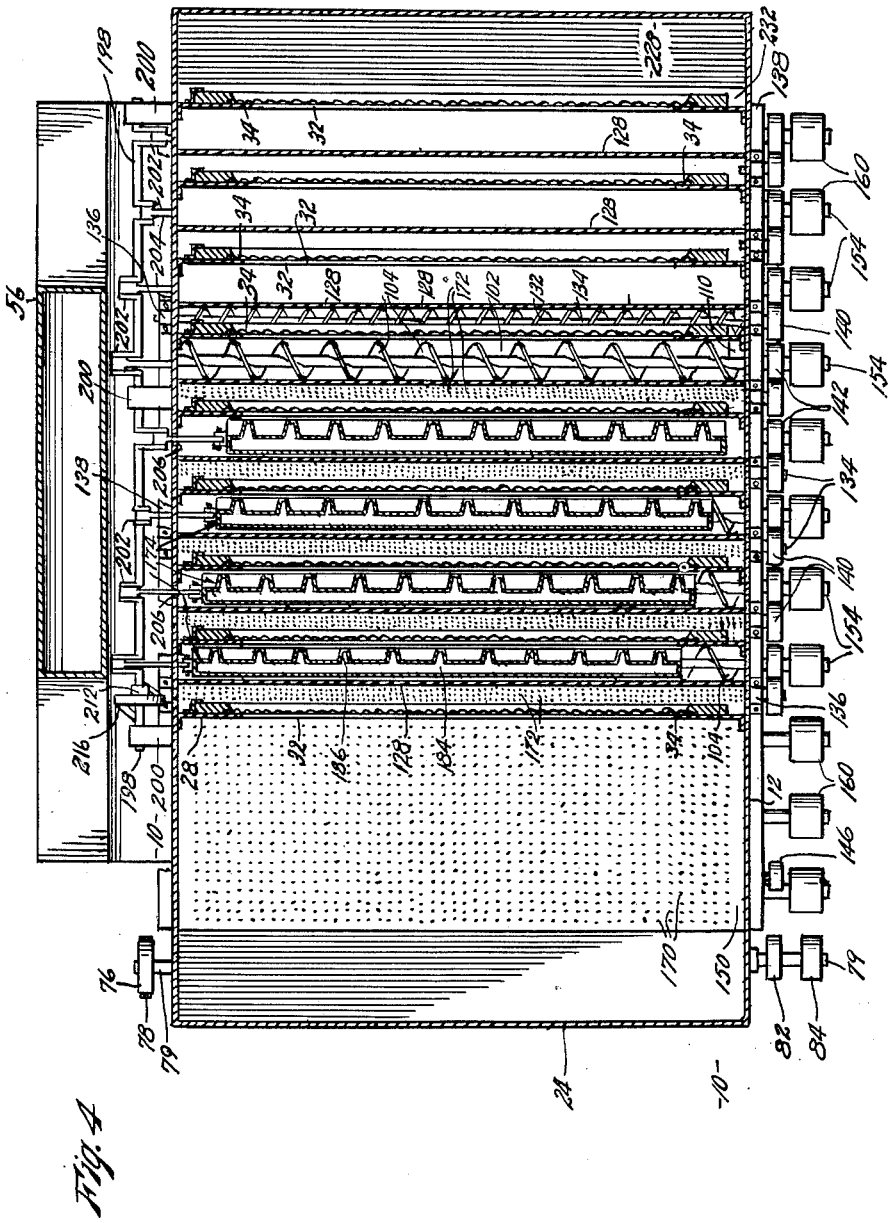
Fig. 4 is a horizontal sectional view taken on line IV—IV of Fig. 3 with some parts omitted.

Referring now to Figs. 4 and 5 wherein is shown the means for reciprocating dust chambers 174 it will be noted that a crank shaft 198 rotatably mounted in bearings 200 is carried by rear wall 14. For properly distributing the driving load to the crank shaft it will be noted that the cranks 202 are circumferentially spaced apart about the crank shaft so as to vary the time for starting the driving of the various dust chambers. A connecting rod 204 connects each dust chamber 174 with one of the cranks 202. The connecting rod 204 passes through a slot 206 formed through back wall 14 and is connected with bracket 208 by means of pin 210. The length of stroke of the cranks 202 determines the reciprocal stroke of the dust chamber which should be substantially the distance between adjacent ribs 186. Mounted on crank shaft 198 is a belt pulley 212 which is operatively connected with belt pulley 214 by means of a twisted belt 216. This belt pulley 214 is mounted on the driven conveyor shaft 134. Each compartment 100 is provided with a holder 218 carrying a plurality of depending, dust collecting strands 220 which extend substantially from partition 98 to a horizontal plane just above conveyors 152, whereby particles of dust collected thereon will be deposited in troughs 148 and delivered to the front of the machine and into the lower conveyor 94 where it will be delivered to the discharge bin, not shown.

A speed control means 222 connecting shaft 50 with the shaft 224 of suction fan or pump 38 serves to drive said fan at a higher speed than shaft 50 to draw a larger quantity of air from the system through conduit 226 and the tapered, vertical conduit 228 which communicates with the last chamber 30 through screen 34. This screen 34 is the finest in the series of screens which are graduated from the coarsest to the finest from the entrance of the air to the discharge, through fan 38. The lower open extremity 230 of conduit 228 is provided with a hinged closure 232 which is normally held in the closed position by the action of a counter balance weight 234. Should too much dust collect on top of closure 232 it will open downwardly to discharge said accumulation and then move back to the closed position to maintain the system in proper operation condition. To afford easy access to the various compartments 30 to maintain the parts contained therein in proper order the front wall is made up of a series of panels 236 which are separably removable.

What I claim is:

1. A dust collector comprising a housing having an air inlet and an air outlet, a series of vertically disposed apertured partitions disposed in spaced apart relation in said housing between said air inlet and said air outlet to form a series of compartments, a screen covering the aperture in each of said partitions, a suction means operable to draw a stream of air from said air inlet through all of said compartments to said air outlets, a plurality of dependent dust collecting strands positioned in each of said compartments, a trough in each compartment positioned below said depending strands and adapted to receive particles of dust from said strands, conveying means associated with said troughs and operable to move said accumulated dust from said troughs, and suction means operable whereby dust collected on the inflow side of said screens is removed therefrom and delivered to conveying means.

2. A dust collector comprising a housing having an air inlet and an air outlet, a series of vertically disposed, apertured partitions disposed in spaced apart relation in said housing between said air inlet and said air oulet to form a series of compartments, a screen covering the aperture in each of said partitions, a suction means operable to draw a stream of air from said air inlet through all of said compartments to said air outlets, a plurality of depending dust collecting strands positioned in each of said compartments, a trough in each compartment positioned below said depending strands and adapted to receive particles of dust from said strands, conveying means associated with said troughs and operable to move said accumulated dust from said air stream, oscillatable suction means operable whereby dust collected on the air inflow side of said screens is drawn therefrom, said suction means also being operable to deliver the suction air to said air inlet, whereby it is recirculated.

3. A dust collector comprising a housing having air inlet and an air outlet, a series of spaced apart, vertical, apertured partitions forming a series of compartments in said housing, a screen covering the aperture in each of said partitions, a first suction means operable whereby an air stream is drawn through said series of screened compartments in one direction, a plurality of depending dust collecting strands in each of said compartments, a trough in each of said compartments adapted to receive particles of dust from said strands, means operable to move said accumulated dust particles from said trough, a second suction means operable to draw air through said screens in a direction opposite to that induced by said first suction means, whereby to remove trapped dust from the entry faces of said screens, and conduits for conducting the dust-laden air induced by said second suction means back to said air inlet for recirculation.

4. A dust collector comprising a housing having an air inlet and an air outlet, a vertical partition in said housing having an aperture formed therein, a screen covering said aperture, a suction fan for drawing dust laden air into said inlet and through said screen to said outlet, a hollow chamber member carried movably in said housing adjacent the entry face of said screen, means for reciprocating said chamber member in a direction parallel to the face of said screen, the wall of said member adjacent said screen having air inlet slots formed therein adapted by the movement of said member to traverse said screen, and suction means interconnected with said chamber whereby air is drawn into said chamber through said slots and delivered to said housing inlet for recirculation.

5. A dust collector comprising a housing having an air inlet and an air outlet, a vertical partition in said housing having an aperture formed therein, a screen covering said aperture, a suction fan for drawing dust laden air into said inlet and through said screen to said outlet, a hollow chamber member carried movably in said housing adjacent the entry face of said screen, means for reciprocating said chamber member in a direction parallel to the face of said screen, said housing forming a compartment beneath the level of said screen, said movable chamber member having slots formed in the wall thereof adjacent said screen, and being open at the bottom to communicate with said compartment, a conduit interconnecting said compartment with said housing inlet, and suction means in said conduit for drawing air into said movable chamber through said slots and delivering it to said housing inlet for recirculation.

6. A dust collector comprising a housing having an air inlet and an air outlet, a vertical partition in said housing having an aperture formed therein, a screen covering said aperture, a suction fan for drawing dust laden air into said inlet and through said screen to said outlet, a hollow chamber member carried movably in said housing adjacent the entry face of said screen, means for reciprocating said chamber member in a direction parallel to the face of said screen, the wall of said member adjacent said screen having air inlet slots formed therein adapted by the movement of said member to traverse said screen, suction means interconnected with said chamber whereby air is drawn into said chamber through said slots and delivered to said housing inlet for recirculation, a plurality of depending dust collecting strands carried in said housing in spaced relation from the entry face of said screen, a trough carried in said housing beneath said strands, and adapted to receive accumulated dust as it falls from said strands, and means for removing said dust from said trough.

ELMER W. THRAILKILL.

References Cited in the file of this patent

UNITED STATES PATENTS

| Number | Name | Date |
| --- | --- | --- |
| 407,948 | Case | July 30, 1889 |
| 1,062,942 | Woods | May 27, 1913 |
| 1,088,041 | Stewart | Feb. 24, 1914 |
| 1,130,596 | Herbing | Mar. 2, 1915 |
| 1,341,129 | Hopkins | May 25, 1920 |
| 1,484,260 | Gibbs | Feb. 19, 1924 |
| 1,755,011 | Ludlam | Apr. 15, 1930 |
| 1,944,268 | Rathbun | Jan. 23, 1934 |